Feb. 18, 1958 H. C. GOODRICH 2,824,170

SEMI-CONDUCTOR SIGNAL PROCESSING CIRCUITS

Filed Nov. 26, 1954

INVENTOR.
HUNTER C. GOODRICH
BY H. D. Newton
ATTORNEY

United States Patent Office 2,824,170

Patented Feb. 18, 1958

2,824,170

SEMI-CONDUCTOR SIGNAL PROCESSING CIRCUITS

Hunter C. Goodrich, Collingswood, N. J., assignor to Radio Corporation of America, a corporation of Delaware Application November 26, 1954, Serial No. 471,435

The terminal fifteen years of the term of the patent to be granted has been disclaimed 8 Claims. (Cl. 178—69.5)

Figure 1:
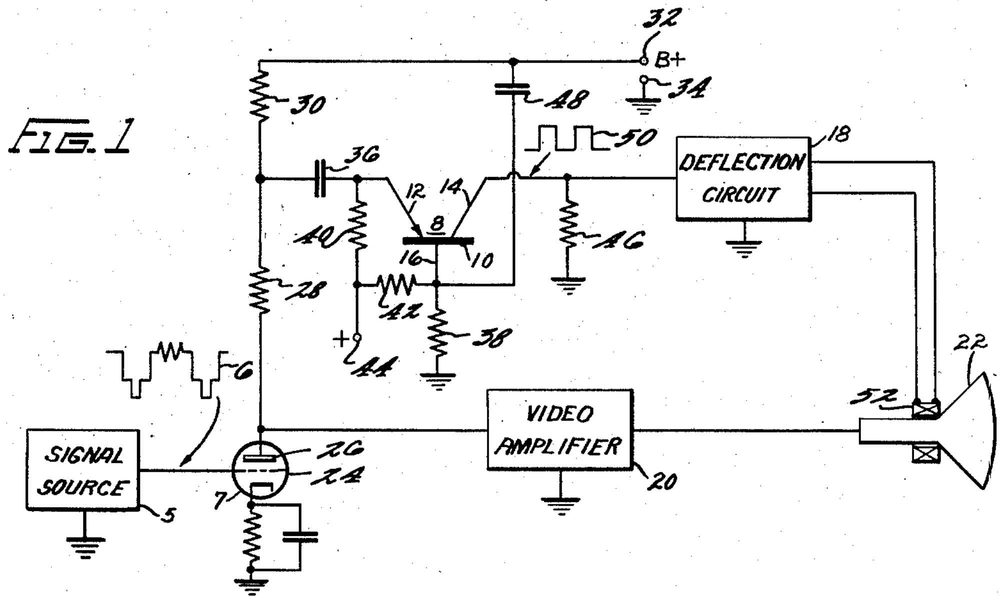

This invention relates, in general, to semi-conductor signal processing circuits and in particular to circuits utilizing transistors for separating synchronizing signal information from a received television signal.

Electrical systems often require some means for separating a predetermined amplitude range of signal information from a given alternating current input signal. As an example of this requirement, in television receiving systems the synchronizing signal information has to be separated from the received television signal. This function is generally achieved by a tube known as a "clipper." Transistors may also perform the function of removing the synchronizing signal from the television signal. Generally, the composite television or video signal is applied to the separator transistor from a video amplifier tube.

As an example of the type circuit described, the cathode of the tube may be connected with the input electrode of the transistor. Because of the higher voltage obtainable from the anode of the tube, however, it may often be desired to apply the composite signal to the input electrode of the transistor from the plate of the video amplifier tube. Generally, the circuit connections required for such a circuit are relatively simple and may be preferred for this reason.

In general, the synchronizing signal portion of the composite video signal which is applied to the grid of the video amplifier tube is of a negative polarity. If the output electrode is chosen to be the cathode of the tube, this means that the signal which is applied to the separator transistor is also of negative polarity. If transistors of P type conductivity are utilized, therefore, the transistor must be of the grounded base configuration, since P type transistors of the grounded emitter configuration require that the signal which is applied to their base be of positive polarity. Thus, when using a P type transistor of the grounded emitter configuration for these applications, the output signal from the video amplifier tube must be taken from the anode rather than the cathode.

One disadvantage of supplying the signal to the separator transistor from the anode of the video amplifier tube is that there is often present considerable 60-cycle hum and vertical deflection components on the anode power supply. These undesired alternating current components are often referred to as "ripple." In order to remove these ripple components, filter circuits could be added, but this is relatively expensive and adds to the bulk of the circuit. The undesired ripple is a particular problem when a transistor is used as the synchronizing signal separator since transistors, in general, require a relatively low impedance and low voltage driving source. Thus, the ripple may be a considerable percentage of the signal which is applied to the transistor which may interfere to a considerable extent with the separation of the synchronizing signal information from the received video signal.

It is, accordingly, an object of the present invention to provide an improved and reliable signal separator circuit for television receivers and the like which is adapted to utilize semi-conductor devices, such as transistors, efficiently as the active signal separating element.

It is another object of the present invention to provide a circuit utilizing a transistor for separating synchronizing signal information from a received video signal wherein undesired alternating current ripple components are effectively eliminated.

It is a further object of the present invention to provide a transistor synchronizing signal separator for television receivers and the like wherein the signal may be applied to the transistor from the anode circuit of a video amplifier tube without undesired alternating current ripple components.

These and further objects and advantages of the present invention are achieved, in general, in a circuit arrangement wherein the signal available from the anode circuit of a video amplifier tube is used to supply the input signal to the input electrode of a transistor which serves as a synchronizing signal separator. The input electrode may be either the base or the emitter of the transistor, depending on whether a grounded emitter or grounded base configuration is used. The common electrode, which may be either the emitter or the base electrode, is connected to ground through a direct current conductive impedance element. To eliminate the undesired ripple components as referred to above, a by-pass capacitor is connected from the common electrode to the anode power supply. In this manner, ripple or hum balancing is achieved and the undesired alternating current components are prevented from appearing as an input signal to the transistor and thus from interfering with the synchronizing separation operation.

Figure 2:
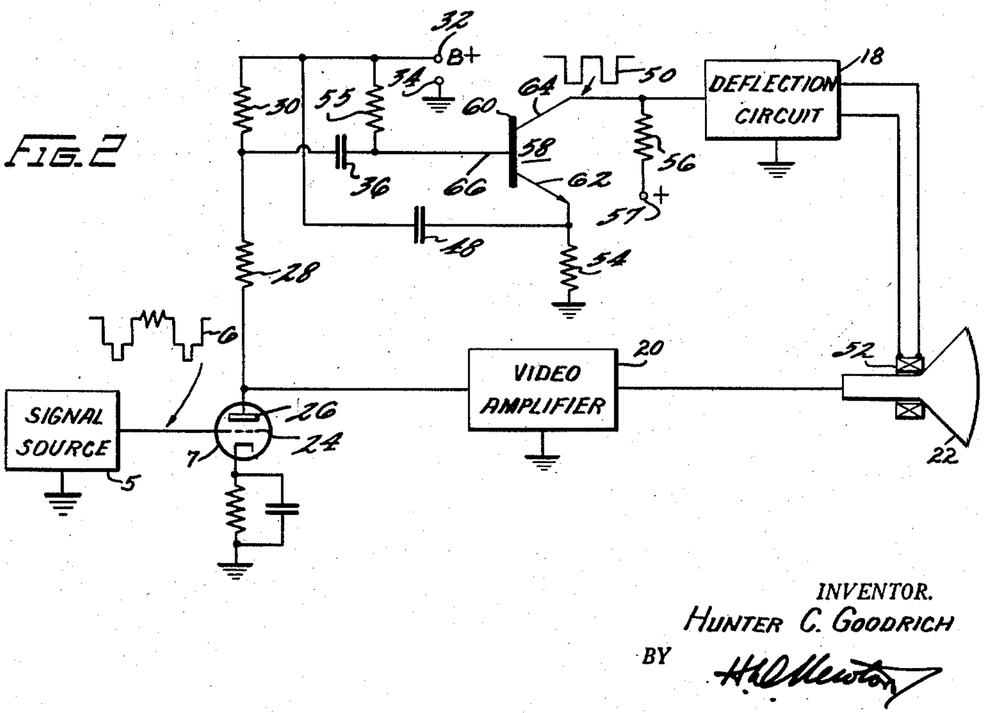

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a synchronizing signal separator and amplifier circuit utilizing a transistor signal separator of the grounded base configuration, in accordance with the invention; and Figure 2 is a schematic circuit diagram of a synchronizing signal separator and amplifier circuit utilizing a transistor signal separator of the grounded emitter configuration, in accordance with the present invention.

Referring now to the drawing, wherein like parts are indicated by like reference numerals in both figures, and referring particularly to Figure 1, a synchronizing signal separator circuit for a television receiver includes, in general, a source of alternating current signals 5, such as a composite video signal 6, a video amplifier tube 7, a transistor synchronizing signal separator 8, a conventional television receiver deflection circuit 18, a conventional video amplifier 20 and a kinescope 22. The video signals 6 from the signal source 5 are applied to the grid 24 of the video amplifier tube 7, and amplified output signals are taken from the anode 26 of the video amplifier tube 7 and applied to the video amplifier 20. To this end, the anode 26 is connected directly with the video amplifier 20. Amplified output video signals from the video amplifier 20 are, in turn, applied to the contorl grid of the kinescope 22 for the reproduction of a television picture on the screen thereof.

The anode 26 of the video amplifier tube 7 is connected through a pair of load resistors 28 and 30 to a source of power supply potential which has a positive (B+) terminal 32 and a negative terminal 34 which is connected to a point of fixed reference potential or ground for the system as shown. Since the transistor 8 requires, in general, a relatively low impedance and low voltage driving source, its input signals are supplied by tapping up on the anode load to the junction point of the resistors 28 and 30. This junction point is coupled through a coupling capacitor 36 to the input electrode or emitter 12 of the transistor 8. While, in general, the connection to the input electrode of the transistor synchronizing signal separator 8 will be tapped up on the video amplifier load resistance, it does not necessarily have to be and this connection could be made directly with the anode 26.

The transistor 8 may be considered to be a junction transistor of the P–N–P type although other types of transistors and transistors of opposite conductivity types could be used. If, for example, and N–P–N junction transistor is substituted for the transistor 8, the polarity of the transistor biasing supply would have to be reversed and the polarity of the input signal which is applied from the anode of the tube 7 would also have to be reversed. This would require that the signal source 5 supply video signals of a positive polarity to the tube 7. In addition to an input electrode, which in this case is the emitter 12, which is cooperatively associated with a semi-conductive body 10 of the transistor 8, the transistor 8 also includes a common or base electrode 16 and an output or collector electrode 14, both of which are also cooperatively associated with the semi-conductive body 10.

The base 16 of the transistor 8 is connected to ground through a resistor 38. To provide the desired synchronizing signal separation, a slight forward bias is applied between the emitter 12 and the base 16 of the transistor 8 in the absence of an input signal. To this end, the emitter 12 and the base 16 are connected through respective resistors 40 and 42 to a positive terminal 44, which may be connected to the positive terminal of any suitable source of direct current voltage, such as a battery. Thus, the resistor 42 and the resistor 38 form a voltage dividing network in the base circuit such that the emitter 12 will be positive with respect to the base 16. To achieve ripple or hum balancing or elimination, in accordance with the present invention, the junction of the base 16 and the resistor 38 is returned through a by-pass capacitor 48 to the positive (B+) terminal 32 of the plate bias supply. The collector 14 of the transistor 8 is connected to ground through suitable load means such as illustrated by a resistor 46. The synchronizing signals or pulses 50, which are separated from the composite video signal by the transistor 8, are applied to the deflection circuit 18 which, in turn, applies the deflection signals to a beam deflection yoke 52 of the kinescope 22.

In operation, the transistor 8 is biased near cut-off so that it is only slightly conductive in the absence of a received signal. The initial bias determined the lower limits of the output synchronizing pulses 50. When a video signal 6 is applied to the emitter 12, however, the emitter potential rises rapidly in a positive direction. The collector current will, accordingly, increase and continues to increase until collector saturation is attained and the net collector voltage is substantially equal to the base voltage. This action will define the upper limit of the output synchronizing pulses 50. Any noise or unwanted signal excursions in excess of the synchronizing signal peaks will, therefore, be clipped. The current flow through resistor 40 during the application of the synchronizing pulses makes the average voltage at emitter 12 negative, thus permitting collector current flow in the transistor 8 only during the application of positive synchronizing pulses. The resulting output signal 50 will then represent a double-clipped synchronizing signal suitable for application to the deflection circuit 18.

As was mentioned hereinbefore, there is generally unwanted alternating current ripple components, such as 60-cycle hum and vertical deflection components on the B+ biasing supply for the anode of the video amplifier tube. This could be eliminated by suitable, but expensive and bulky filtering means. If not eliminated, however, the ripple components will be applied as a signal between the emitter 12 and the base 16 of the transistor synchronizing signal separator 8. This would, it will be understood, interfere with the separation of the synchronizing signal from the received video signal by the transistor 8. Thus, in Figure 1, without provision of the capacitor 48 in the circuit as described, and in accordance with the invention, the ripple components would be applied between the emitter 12 and the base 16.

In accordance with the invention, however, by connecting the capacitor 48 between the common or base electrode 16 of the transistor 8 and the positive terminal 32 of the plate biasing supply, the ripple components, such as hum, are effectively balanced out. In other words, by connecting the by-pass capacitor back to the positive supply terminal 32 rather than ground, as would be conventional, the unwanted ripple filter components are prevented from being applied as a signal between the emitter 12 and the base 16 of the transistor 8. Accordingly, the ripple components on the power supply are effectively attenuated and prevented from affecting the synchronizing signal separation function of the transistor 8. This is accomplished, by provision of the present invention, moreover, without the use of relatively expensive filtering means.

It is often desired to utilize a transistor of the common emitter configuration as the synchronizing signal separator since, in general, higher gain operation is possible with this configuration. Moreover, it may be desirable to utilize a transistor of P type conductivity, such as an N–P–N junction transistor, rather than a P–N–P junction transistor as the separator. Thus, referring to Figure 2, a transistor 58, which may be considered to be an N–P–N junction transistor, is used as the synchronizing signal separator. The transistor 58 includes a semi-conductive body 60, with which an input or base electrode 66, a common or emitter electrode 62 and an output or collector electrode 64 are cooperatively associated. It should be understood that the transistor 58 need not be a junction transistor and could be a transistor of an opposite conductivity type. If a transistor of N conductivity were used, however, the polarity of the biasing voltages would have to be reversed, as would the polarity of the video signal 6 which is supplied by the signal source 5 to the video amplifier tube 7.

The emitter 62 of the transistor separator 58 is connected to ground through a resistor 54. Collector biasing potentials are provided by connecting the collector 64 through a load resistor 56 to a positive terminal 57, which may be connected to a suitable source of positive direct current potential. To provide a biasing voltage between the emitter 62 and the base 66 of the transistor 58 which is in the slightly forward or relatively conducting direction in the absence of an applied video signal, the positive anode voltage supply terminal (B+) 32 is connected through a resistor 55 having a relatively large resistance to the base 66.

It will be seen that in other respects the circuit configuration illustrated in Figure 2 is substantially identical to the one illustrated in Figure 1. One difference, however, is that since the transistor synchronizing signal separator 58 is of the grounded emitter configuration, there will be a phase reversal between the base 66 and the emitter 64. Accordingly, the output synchronizing pulses 50 will be of a negative polarity.

To provide the desired ripple or hum balancing, in accordance with the invention, the junction of the common or emitter electrode 62 and the emitter resistor 54 is connected through the by-pass capacitor 48 to the positive terminal (B+) of the anode supply voltage. In operation, this connection will prevent the application of the undesired ripple components as a signal between the base 66 and the emitter 62 of the transistor 58. The circuit operation thus will be seen to be substantially identical to the operation of the circuit illustrated in Figure 1 and provides the same advantages. In this connection, it will be understood that the grounded emitter transistor 58 is biased in much the same manner as the grounded base transistor of Figure 1 such that the resulting output signal 50 represents a double-clipped synchronizing signal which is suitable for application to the input of the deflection circuit 18.

As described herein, semi-conductor signal processing circuits for performing the circuit operation of separating synchronizing signal information from a received television signal are stable and efficient in operation. In accordance with the teachings of the invention, a signal may be applied to a transistor synchronizing signal separator from the anode of a video amplifier tube without undesired alternating current ripple components which may be present on the plate supply voltage. Thus, ripple or hum balancing is achieved without the necessity of providing relatively expensive and bulky filter circuits and reliable circuit operation is possible at a relatively small cost.

What is claimed is:

1. In a television signal separator circuit for separating synchronizing signal information from an applied video input signal, the combination with a signal amplifying device having at least an input and an output electrode, of means providing a source of potential connected with said output electrode, means for applying said video input signal to said input electrode, a semi-conductor device including an input, an output and a common electrode, and operative to separate said synchronizing signal information from said applied input signal, means connecting the output electrode of said signal amplifying device with the input electrode of said semi-conductor device, and means providing a signal conductive coupling connection between the common electrode of said semi-conductor device and said source of potential to effect suppression of undesired alternating current components for said separator circuit.

2. In a television signal separator circuit for separating synchronizing signal information from an input video signal, the combination with a signal amplifying device having at least an input and an output electrode, of means providing a source of potential connected with said output electrode, means for applying said input video signal to said input electrode, a semi-conductor device including an input, an output and a common electrode, means connecting the output electrode of said signal amplifying device with the input electrode of said semi-conductor device, means providing circuit connections and biasing potentials for the electrodes of said semi-conductor device for operating said semi-conductor device to separate said synchronizing signal information from said applied input signal, and capacitive means connected between the common electrode of said semi-conductor device and said source of potential to effect suppression of undesired alternating current components for said separator circuit.

3. In a television signal separator circuit for separating synchronizing signal information from a video input signal, the combination with a video amplifier tube having a cathode, a grid and an anode, of means providing a source of operating voltage connected with said anode, means for applying said video signal to said grid, a transistor including an input, an output and a common electrode, means providing signal conveying coupling between said anode and the input electrode of said transistor, means providing biasing potentials for the electrodes of said transistor for operating said transistor to separate said synchronizing signal information from said video input signal, and a capacitor having low impedance at signal frequencies connected between the common electrode of said transistor and said source of operating voltage to provide suppression of ripple components for said separator circuit.

4. In a television receiver, including a signal processing circuit for separating a predetermined range of signal information from a television input signal, the combination with a television signal amplifying tube having at least a grid and an anode, of means providing a source of supply voltage connected with said anode, means for applying said television input signal to said grid, a circuit ground, a transistor including an input, an output and a common electrode, means connecting said common electrode to said circuit ground, means connecting said anode with said input electrode, means providing biasing potentials for the electrodes of said transistor for operating said transistor to separate said predetermined range of signal information from said applied television input signal, and a capacitor connected between said common electrode and said source of potential and providing suppression of undesired alternating current components for said signal processing circuit.

5. A signal processing circuit as defined in claim 4 wherein said transistor is of P type conductivity.

6. A signal processing circuit as defined in claim 4 wherein said transistor is of N type conductivity.

7. In a television signal separator circuit for separating synchronizing signal information from a video input signal, the combination with a video amplifier tube having a cathode, a grid and an anode, of means providing a source of operating voltage, a point of reference potential, a load resistor connecting said source with said anode, means for applying said video signal to said grid, a transistor including an emitter, a collector and a base electrode, means connecting said emitter electrode with said point of reference potential, means connecting an intermediate point of said load resistor with the base electrode of said transistor, means providing biasing potentials for the electrodes of said transistor for operating said transistor to separate said synchronizing signal information from said video input signal, and a capacitor connected between the emitter electrode of said transistor and said source of operating voltage and providing suppression of ripple components for said separator circuit.

8. In a television signal separator circuit for separating synchronizing signal information from a video input signal, the combination with a video amplifier tube having a cathode, a grid and an anode, of means providing a source of operating voltage, a point of reference potential, load impedance means connecting said source with said anode, means for applying said video signal to said grid, a transistor including an emitter, a collector and a base electrode, means connecting said base electrode with said point of reference potential, means connecting an intermediate point of said load impedance means with said emitter electrode, means providing biasing potentials for the electrodes of said transistor for operating said transistor to separate said synchronizing signal information from said video input signal, and a capacitor connected between said base electrode and said source of operating voltage and providing suppression of ripple components for said separator circuit.

References Cited in the file of this patent

UNITED STATES PATENTS

| | | |
|---|---|---|
| 2,676,271 | Baldwin | Apr. 20, 1954 |
| 2,685,039 | Scarbrough | July 27, 1954 |